United States Patent [19]

Rissberger

[11] 4,113,278
[45] Sep. 12, 1978

[54] ACCESSORY KIT AND METHOD FOR PROVIDING SUPPLEMENTAL ANTI-SWAY CONTROL FOR AUTOMOTIVE VEHICLES

[76] Inventor: C. Glen Rissberger, 5055 SW. Elm, Beaverton, Oreg. 97005

[21] Appl. No.: 797,740

[22] Filed: May 17, 1977

[51] Int. Cl.² ............................................. B60g 11/20
[52] U.S. Cl. .................................................. 280/689
[58] Field of Search ..................... 280/689, 725, 726; 267/57

[56] References Cited

U.S. PATENT DOCUMENTS

| | | | |
|---|---|---|---|
| 2,961,253 | 11/1960 | Allison | 280/689 |
| 3,218,053 | 11/1965 | Shreve | 280/689 |
| 3,315,952 | 4/1967 | Vittone | 280/689 |

Primary Examiner—Robert R. Song
Attorney, Agent, or Firm—Chernoff & Vilhauer

[57] ABSTRACT

An anti-sway bar accessory in kit form for increasing stability at the front wheels of an automotive vehicle during sharp turns and similar sway-causing events. A pair of brackets, each having complementary upper and lower members and a resilient member sandwiched therebetween, are connected to the vehicle idler arm mounts using the vehicle's pre-existing factory-supplied fasteners. The bar is configured to be closely received within respective apertures formed in each of the resilient members and, thereafter, assembly is completed by fastening each of the ends of the bar to the respective lower A-arms on the vehicle utilizing pre-existing apertures formed therein. The bar is also configured to closely correspond to the planes of the undercarriage of the vehicle so as to provide, when installed, optimum clearance between the bar and the road surface.

4 Claims, 7 Drawing Figures

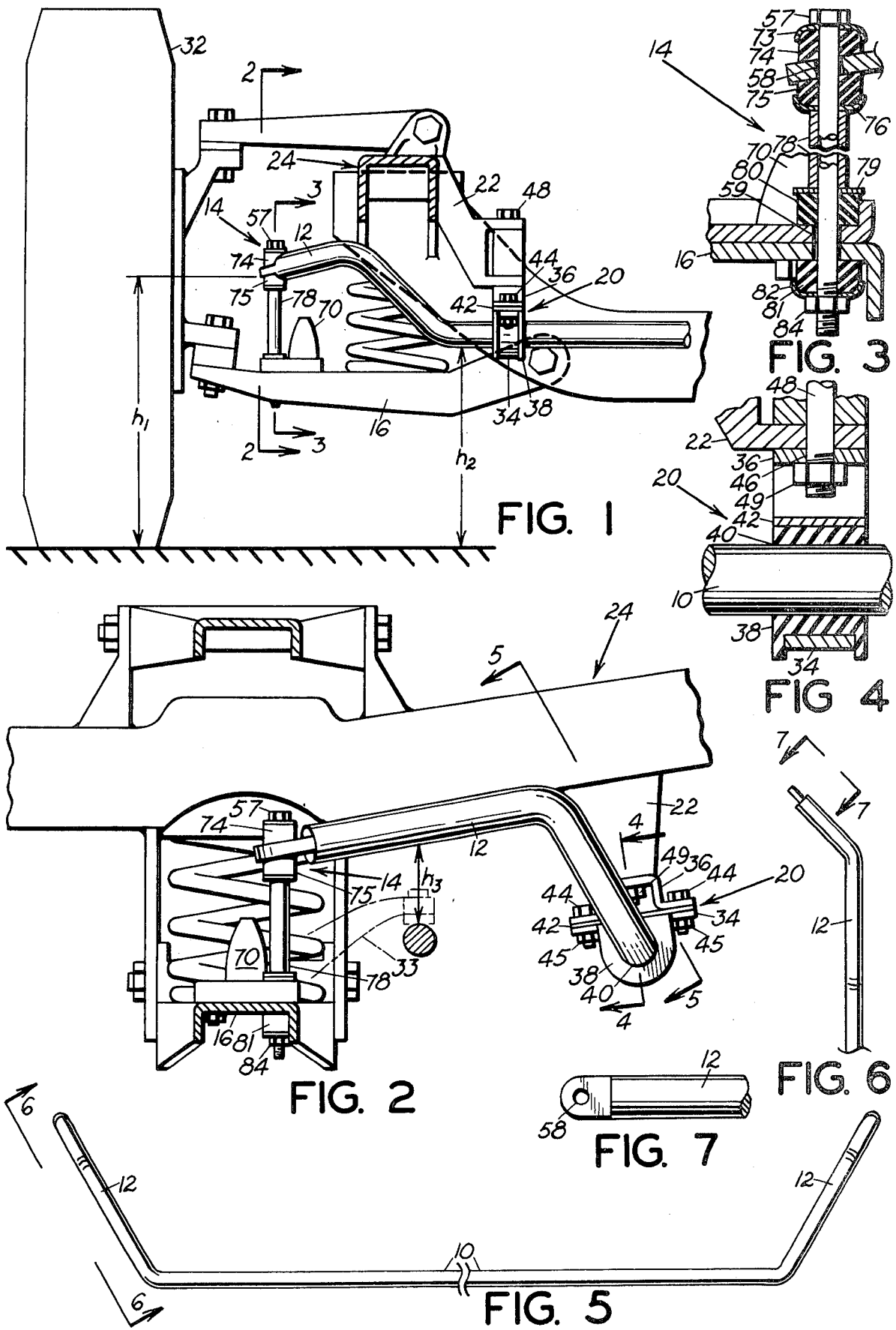

ACCESSORY KIT AND METHOD FOR PROVIDING SUPPLEMENTAL ANTI-SWAY CONTROL FOR AUTOMOTIVE VEHICLES

BACKGROUND AND SUMMARY OF THE INVENTION

The present invention relates generally to improvements in automotive vehicles, and more particularly to an accessory kit and method for retrofitting such vehicles with an anti-sway bar so as to enhance the stability thereof during sharp turns, wind gusts and other sway-causing events. The present invention is described with reference to a Dodge Van of the type marketed in this country currently and for the past several years, it being understood however that the invention is also readily adaptable for use with other vans, light trucks and automobiles of generally similar undercarriage design.

It is well known in the art that additional performance and enhanced safety during performance can be obtained from automotive vehicles by the addition of special structural members to the front suspension and steering components thereof. For example, complex retrofitting of supplemental steering stability components to standard automotive steering systems is customary in the art of auto racing and permits vehicles used therefor to negotiate racetrack turns at exceptionally high speeds.

Many of the factors necessitating supplemental steering stability components for racing vehicles are also presented to a lesser degree by Dodge Vans and the like when they are used under adverse hauling or road conditions. However, the complex arrangements provided for racing vehicles exceed the requirements of a Van and thus are either cost prohibitive, nonadaptable to conventional operating environments, or both. Accordingly, structural members consisting of a metal elongate bar, referred to as an anti-sway bar, interposed between the front wheels of the Van and supporting structure therefor have been presented which provide the supplemental steering stability necessitated by conventional but adverse operating environments.

Several factors have heretofore unduly complicated the supporting structure for such anti-sway bars and have precluded their widespread acceptance. One basic difficulty in retrofitting Vans with an anti-sway bar stems from the fact that it is desirable for each end thereof to be attached to a front suspension of the vehicle, at the lower A-arm of the suspension unit, positioned at one height relative to the surface supporting the vehicle while the midportion of the bar is disposed beneath the foremost portion of the main frame housing a steering linkage at a second and lesser height. Further, it is necessary to provide vertical support for the bar at a distance spaced from the A-arms of the vehicle suspension system, such as beneath the steering linkage. Each connection and support point must be partially deformable to permit shock absorbing flexing or movement of the anti-sway bar, thereby diminishing both the intensity and the incidents of shock transmitted to the steering apparatus. Conversely, a multiplicity of steering linkage components are situated within the potential support area, many of which are designed to have a delicate geometric balance and, accordingly, it is not desirable to permit the anti-sway bar to strike these components during its flexing movement. A further complicating factor stems from the frequent and common use of Vans over uneven terrain thereby making it undesirable to reduce vehicular ground clearance by mounting the bar any substantial distance beneath the undercarriage. Yet another complicating factor stems from the potential high intensity of the forces applied to the anti-sway bar which mandates a support point having substantial mechanical strength. Finally, the complex arrangement of steering linkage components disposed intermediate the lower A-arms severely restricts the provision for direct vertical support of the anti-sway bar component.

One known anti-sway device resolves the support difficulty by mounting an offset supporting framework to each respective side of the vehicle main frame, the framework having sufficient offsets to extend beneath the main frame and steering linkage and providing supportive loops for the anti-sway bar therebeneath. This potential solution, however, necessitates the assembly of a complex array of pieces which requires considerable mechanical skill and extends the installation time considerably beyond two hours. Moreover, the overly complex and low-slung assembly detracts from the aesthetic appearance of the Van and unnecessarily limits ground clearance.

Another known device deals with the support problem by providing an anti-sway bar which offsets rearwardly of the engine in order to provide better clearance for the supporting structure. However, this approach results in a location for the supporting structure wherein the bar is permitted to rub occasionally against the transmission, causing undue noise and wear; also it effectively limits any subsequent accessory installations, such as exhaust headers and the like.

The present invention resolves the above-stated difficulties attendant to the installation of an anti-sway bar device by providing a pair of apertured, resilient support brackets which are readily installed by removing and thereafter replacing two pre-existing nuts on the left and right idler arm brackets of the vehicle suspension system. The anti-sway bar of the present invention readily slides into the apertures formed in the support brackets and the assembly is then completed by bolting the anti-sway bar to the lower A-arms of the left and right vehicle suspensions, again using pre-existing holes. Accordingly, since the anti-sway assembly is readily installed without need for lifting the Van, drilling holes and the like, it can be quickly installed in a matter of minutes using conventional and readily available wrenches and sockets. Moreover, the anti-sway bar is configured to fit snugly against the mainframe so as to maximize both ground clearance and aesthetic appearance.

It is therefore a principal objective of the present invention to provide a kit and method for supporting an anti-sway bar intermediate the front wheels of a Dodge Van and similar vehicles which is adapted for mounting upon the lowermost surface of the vehicle idler arm mounts.

It is an important objective of the present invention to provide a kit and method for retrofitting Dodge Vans and similar vehicles with an anti-sway bar accessory which is readily installable in a matter of minutes by Van users having basic mechanical skills and a minimum of tools.

Yet another important objective of the present invention is to provide a kit and method for retrofitting Dodge Vans and similar vehicles with an anti-sway bar which provides optimum ground clearance and aesthetic appearance.

Still another important objective of the present invention is to provide a kit and method for retrofitting Dodge Vans and similar vehicles with an anti-sway device which, by eliminating much of the bulk and complexity of the supporting assembly, lends itself to economical manufacture and shipment.

A further objective of the present invention is to provide an anti-sway bar assembly which both does not interfere with existing vehicular undercarriage components nor prevent the addition of other accessory components thereto.

It is an important feature of the present invention to equip Dodge Vans and similar vehicles with an anti-sway device which can be removed, disassembled and replaced in whole or in part in a matter of minutes, thereby facilitating maintenance and repair.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIG. 1 is a partial end view of the right front suspension of a Dodge Van having the anti-sway bar of the present invention mounted thereon.

FIG. 2 is an enlarged view of the mounting connections of the present invention taken along lines 2—2 of FIG. 1.

FIG. 3 is an enlarged view of the fastener assembly of the present invention taken along lines 3—3 of FIG. 1.

FIG. 4 is an enlarged cross section of the resilient support assembly of the present invention taken along lines 4—4 of FIG. 2.

FIG. 5 is a side view of the anti-sway bar of the present invention taken along lines 5—5 of FIG. 2.

FIG. 6 is a partial side view of an offset end of the anti-sway bar of the present invention taken along lines 6—6 of FIG. 5.

FIG. 7 is an enlarged side view of the anti-sway bar depicting an apertured end thereof as seen along lines 7—7 of FIG. 6.

DETAILED DESCRIPTION OF THE INVENTION

Referring now to the Figures, the anti-sway device of the present invention is in the form of an accessory kit, adapted to be installed on the front undercarriage of a Dodge Van or similar vehicle, which comprises a tubular metal bar 10 having curved offset ends 12 forming a pair of zigzag bends and a relatively straight portion intermediate the zigzag bends, a pair of resilient fastener assemblies 14 for connecting the ends of the bar to respective ones of a pair of lower A-arms 16 on the front suspension units of the automotive vehicle and a pair of support assemblies 20 for resiliently supporting the bar from respective ones of a pair of steering idler arm mounts 22 on said vehicle.

The curved offsets 12 and the relatively straight portion of the anti-sway bar 10 roughly correlate to the configuration of the undercarriage intermediate the lower A-arms 16 of the vehicle so as to permit the bar to connect to the pair of A-arms at a first height $h_1$ above a supporting surface 28 and to extend beneath the pair of steering idler arm mounts 22 at a second height $h_2$ above the supporting surface.

The bar 10 may be composed of any material having sufficient strength characteristics to provide anti-sway control at the front wheels 32 of the automotive vehicle. However, it is important to configure the bar, when installed, to closely correspond to the undercarriage of the vehicle since this will provide optimum spacing between the bar and the supportive surface 28, thus not substantially affecting the vehicle's capability for traversing uneven terrain. Moreover, such conforming configuration permits the bar to blend with the lines of the vehicle undercarriage thereby, in contrast to other conventional anti-sway control devices, preventing any disruptive visual effect marring the aesthetic appearance of the vehicle. It is to be noted that the curved offsets 12, adjacent the respective ends of the bar, each comprise a pair of zigzag bends providing adequate clearance $h_3$ (FIG. 2) between the bar and the vehicle's tierods 33 for reasons hereinafter to be described.

It has been determined that the vehicle idler arm mounts 22 of a Dodge Van are suitably adaptable for supporting an anti-sway bar. In contradistinction, however, it is especially important to note that other known vehicular idler arm mounts often are designed such as to preclude the application of high intensity forces thereto. Accordingly, careful structural analysis should precede application of the present invention to other types of automotive vehicles.

The pair of support assemblies 20 are configured to provide resilient support for the anti-sway bar 10 from the steering idler arm mounts 22 at a minimum spacing from the vehicle's undercarriage 24. These support assemblies provide shock-absorbing flexing while simultaneously preventing the bar from striking or rubbing against the vehicle's undercarriage and also provide anti-sway control without substantially altering either the vehicle's ground clearance or aesthetic appearance.

Each support assembly 20 (FIGS. 2 and 4) includes a pair of complementary upper and lower C-shaped brackets 34 and 36, a C-shaped resilient bushing 38 adapted to be closely received within the lower bracket 34 and having an aperture 40 formed therein for closely receiving the bar 10 therethrough, a flat plate 42 disposed intermediate the bushing and the upper bracket 36 for restricting the upward bar movement during shock-absorbing flexing, and suitable removable fasteners such as nut and bolt assembly 44, 45 for securing the lower bracket to the upper bracket. It is important to note that the upper bracket has an aperture 46 formed therein which is suitable for closely receiving therethrough a pre-existing, factory-supplied nut-and-bolt fastener assembly 48, 49, thereby permitting the resilient support assemblies 20 to be readily connected to the respective vehicle idler arm mounts 22.

The resilient bushings 38 of the support assemblies 20 are composed of an elastomeric, partially deformable material such as durable rubber, neoprene, ethylene propylene dicopolymer or the like. The resilient deformability of such material permits flexing of the anti-sway bar 10, thereby absorbing some of the shock applied to the bar during sharp turns, wind gusts and other sway-causing events. The upward travel of the bar during such flexing is effectively limited by the flat plate 42 which permits flexing of the bar closely proximate the undercarriage 24 without however permitting the bar to strike or rub against any pre-existing component parts on the vehicle undercarriage.

Mounting of each of the resilient support assemblies 20 is readily accomplished by removing the factory-supplied nut 49 from the bolt 48 extending downwardly from each respective one of the idler arm mounts 22, positioning the upper bracket 36 such that the bolt extends through the upper bracket aperture 46 and the longest dimension of the elongate upper bracket coincides with the longest dimension of the vehicle and, while maintaining such positioning, replacing the nut upon the bolt with the apertured portion of the upper bracket sandwiched therebetween. The resilient bushing 38 is positioned on the anti-sway bar 10 inwardly of the offset 12 and within the lower bracket 34. Thereafter, the lower bracket is positioned against the upper bracket 36, with the flat plate 42 disposed intermediate the bushing and the top bracket, and, while maintaining such positioning, mounting is completed by fastening the brackets together with a pair of bolts 44 and a pair of nuts 45.

Shock-resistant flexing is also permitted at each end of the anti-sway bar 10 by virtue of the resilient fastener assemblies 14. Each fastener assembly (FIGS. 2 and 3) comprises an elongate cap screw 57 having a diameter suitable for being closely received through respective apertures 58 formed in each end of the bar and a pre-existing aperture 59 formed in the corresponding lower A-arms 16 of the vehicle, a plurality of resilient grommets 74, 75, 80 and 81 composed of the elastomeric material, a rigid spacer 78 for limiting the downward movement of the bar so as to prevent the striking of component parts adjacent the A-arms, and a lock nut 84 for completing the respective fastener assemblies.

Mounting of each of the resilient fastener assemblies 14 is readily accomplished by removing and discarding the outermost factory-supplied bolt and nut securing the bump stop 70 to the respective lower A-arms 16, and thereafter using the aperture 59 provided therein to mount the ends of the anti-sway bar 10 to the respective lower A-arms with the resilient fastener assemblies. A first cup washer 73 and resilient grommet 74 is mounted upon the elongate cap screw 57 prior to its insertion through the bar aperture 58 and, thereafter, a second resilient grommet 75 and cup washer 76, a rigid spacer 78, a flat washer 79 and a third resilient grommet 80 are sequentially mounted upon the cap screw prior to its insertion through its respective A-arm aperture 59. Once the cap screw is inserted through the A-arm aperture, assembly is then completed by mounting a fourth resilient grommet 81 and a third cup washer 82 upon the cap screw and then securing the fastener assembly to the A-arm with a lock nut 84. It being understood that care should be exercised while securing the lock nut to avoid excessive compression of the resilient grommets. It being further understood that this particular mounting point on the vehicle A-arms is selected for ease of installation and that other mounting points thereon could be utilized without departing from the essence of the present invention.

Although the vehicle's wheels 32 provide sufficient clearance between the road supporting surface 28 and the vehicle undercarriage to permit installation of the anti-sway bar 10, it may be desirable or advantageous to have the front of the vehicle lifted up to obtain additional clearance during installation. To further facilitate installation it should be noted that the bar may be more readily inserted through the resilient bushings 38 by first applying soap or other lubricant to the ends of the bar and the apertures of the bushings. Most importantly, the sizes of the mounting hardware described above should be closely correlated to the sizes of the hardware removed from the lower A-arms 16 and steering idler arm mounts 22 of the vehicle in order to permit a non-professional consumer having basic mechanical skills and a minimum of wrenches and sockets to readily install without difficulty or the need for special tools the anti-sway bar kit of the present invention.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. An accessory kit, connectable to the pair of steering idler arm mounts and to the A-arms on the undercarriage at the front wheels of an automotive vehicle, for providing supplementary anti-sway control at the front wheels thereof, said accessory kit comprising:
   (a) an elongate bar having length sufficient to extend from a first lower A-arm of said vehicle to an opposing lower A-arm thereof and a configuration closely approximating the respective planes of the undercarriage of said vehicle intermediate said A-arms, said bar having an aperture formed in each of the ends thereof;
   (b) a pair of bushings each composed of elastomeric material and having an aperture formed therein for closely receiving the respective ends of said bar therethrough;
   (c) a pair of brackets each having an upper portion and a lower portion, said portions defining a space therebetween for closely receiving a respective one of said bushing pair therein, said upper bracket portions each having a aperture formed therein suitable for receiving fastener means therethrough for securing said upper bracket portion to a respective one of said steering idler arm mounts;
   (d) means for securing each of said lower bracket portions to its respective upper portion so as to lockingly engage said bushing therebetween; and
   (e) a pair of fastener means comprised of elastomeric material for resiliently securing said respective rod ends to said respective A-arms.

2. A method for mounting an anti-sway bar on the undercarriage of an automotive vehicle, of the type having a pair of steering idler arm mounts and a pair of A-arms at the front wheels thereof, so as to provide said vehicle with supplemental anti-sway control at the front wheels thereof, said method comprising:
   (a) sliding said anti-sway bar through respective apertures formed in a pair of bushings composed of elastomeric material;
   (b) mounting a first bracket having an inner configuration adapted to receive an upper portion of one of said bushings beneath a first steering idler arm mount of said vehicle;
   (c) mounting a second bracket having an inner configuration adapted to receive an upper portion of a second one of said bushings beneath a second steering idler arm mount of said vehicle;
   (d) positioning a third bracket, configured complementary to said first bracket, about a lower portion of said first one of said pair of bushings;
   (e) positioning a fourth bracket, configured complementary to said second bracket, about a lower portion of said second one of said pair of bushings;

(f) positioning said pair of bushings such that said upper portion of each bushing is disposed within a respective one of said first and second brackets;

(g) fastening said third and fourth brackets to said first and second brackets, respectively; and (h) resiliently fastening each of the ends of said anti-sway bar to respective lower A-arms of said vehicle.

3. The method of claim 2 wherein step (g) includes removing an existing rigid-type fastener from each of said A-arms, positioning a fastener comprised of elastomeric material through each of said first and second A-arms and each of said ends of said anti-sway bar respectively, so as to resiliently fasten said rod to said A-arms.

4. An accessory kit for retrofitting an anti-sway bar on the undercarriage of an automotive vehicle, of the type having a pair of steering idler arms and a pair of A-arms at the front wheels thereof, so as to provide anti-sway control at the front wheels thereof, said kit utilizing a factory-provided aperture formed in each of the respective lower A-arms and factory-supplied fasteners mounted intermediate said A-arms on said vehicle so as to permit said kit to be readily and rapidly retrofitted thereto, said accessory kit comprising:

(a) an elongate anti-sway bar having a curved offset adjacent each of the ends thereof and a relatively straight portion intermediate said offsets, said bar further having a predetermined length and an aperture formed therein adjacent each end thereof so as to be mountable at each of said ends to a respective one of said A-arms of said vehicle and extend therefrom beneath a main frame member of said vehicle adjacent to the front portion thereof;

(b) a pair of resilient bushings comprised of elastomeric material and each having an aperture formed therein suitable for closely receiving said bar therethrough, an upper portion and a lower portion;

(c) a first pair of clamp members, each having a configuration suitable for engaging said upper portion of one of said bushings and an aperture formed therein for receiving one of said factory-supplied fasteners so as to be secured thereby to said vehicle;

(d) a second pair of clamp members, each having a configuration suitable for engaging said lower portion of one of said bushings;

(e) connector means for connecting each of said second pair of clamp members to a respective one of said first pair of clamp members with one of said bushings sandwiched therebetween; and (f) a pair of fastener means each having at least one portion suitable for being closely received through one of said factory-supplied apertures for resiliently connecting each end of said bar to a respective one of said A-arms.

* * * * *